United States Patent
Hirobe et al.

(10) Patent No.: US 9,325,197 B2
(45) Date of Patent: Apr. 26, 2016

(54) COIL MODULE AND ELECTRONIC APPARATUS

(71) Applicant: Panasonic Intellectual Property Corporation of America, Torrance, CA (US)

(72) Inventors: Takanori Hirobe, Ishikawa (JP); Yoshio Koyanagi, Kanagawa (JP); Hiroyuki Uejima, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 173 days.

(21) Appl. No.: 14/195,589

(22) Filed: Mar. 3, 2014

(65) Prior Publication Data

US 2014/0306653 A1 Oct. 16, 2014

(30) Foreign Application Priority Data

Apr. 10, 2013 (JP) .................................. 2013-082069

(51) Int. Cl.
*H02J 7/00* (2006.01)
*H02J 7/02* (2006.01)
*H01F 38/14* (2006.01)
*H01F 27/28* (2006.01)
*H01F 27/36* (2006.01)

(52) U.S. Cl.
CPC ............ *H02J 7/025* (2013.01); *H01F 27/2871* (2013.01); *H01F 27/367* (2013.01); *H01F 38/14* (2013.01)

(58) Field of Classification Search
CPC ........................................................ H02J 7/025
USPC ............................................................ 320/108
See application file for complete search history.

(56) References Cited

U.S. PATENT DOCUMENTS

| 7,710,117 | B2* | 5/2010 | Vaughan ............ G01R 33/3415 324/318 |
| 2009/0021212 | A1 | 1/2009 | Hasegawa et al. |
| 2012/0001496 | A1 | 1/2012 | Yamamoto et al. |
| 2014/0306653 | A1* | 10/2014 | Hirobe ................... H01F 38/14 320/108 |
| 2015/0270719 | A1* | 9/2015 | Kurs ....................... H02J 5/005 320/108 |

FOREIGN PATENT DOCUMENTS

| JP | 2008-177516 A | 7/2008 |
| JP | 2009-27025 A | 2/2009 |
| JP | 2013-175673 A | 9/2013 |
| JP | 5286445 B1 | 9/2013 |
| JP | 2013-211464 A | 10/2013 |
| WO | 2009/063975 A1 | 5/2009 |
| WO | 2012/001955 A1 | 1/2012 |

* cited by examiner

Primary Examiner — Suresh Memula
(74) Attorney, Agent, or Firm — Seed IP Law Group PLLC

(57) ABSTRACT

A coil module is disposed inside an electronic apparatus and receives prescribed power. The coil module includes a loop coil, a plate-like magnetic body that is disposed on the loop coil, and a conductive member that has prescribed conductivity and is disposed parallel with the plate-like magnetic body and on a surface, opposite to a surface on which the loop coil is disposed, of the magnetic body. The conductive member projects outward relative to at least a portion of a circumferential surface of the magnetic body.

13 Claims, 22 Drawing Sheets

COIL MODULE AND ELECTRONIC APPARATUS

BACKGROUND

The present disclosure relates to a coil module used for wireless charging and an electronic apparatus incorporating the coil module.

In recent years, cellphones having a wireless charging function have come to be marketed. With the recent increase in multifunctionality and screen size and other requirements in or about cellphones, the capacity of battery packs used in cellphones have increased, resulting in increase in full charging time. Shortening of the full charging time would be key to further spread of cellphones. To this end, it is necessary to attend to the quick charging more than in the past.

Quick charging is enabled by running a large current, and resulting heat generation cannot be suppressed sufficiently because of large power that is consumed in a coil. Since heat generated by a coil affects nearby electronic components, running a large current through the coil is associated with difficulties. However, it is possible to increase the current flowing through a coil by radiating the heat generated by the coil to the outside. Among conventional techniques for radiating the heat generated by a coil to the outside is one relating to the coil-incorporated board that is disclosed in JP-A-2008-177516. The coil-incorporated board that is disclosed in JP-A-2008-177516 is provided with plural heat transmission through-conductors which penetrate through a ferrite magnetic layer that encloses a planar coil conductor and a heat radiation conductive layer which is connected to the heat transmission through-conductors. The heat generated by the planar coil conductor is radiated to the outside from the heat radiation conductive layer via the heat transmission through-conductors.

However, the above-described coil-incorporated board disclosed in JP-A-2008-177516 has the following problems. Since the heat transmission through-conductors are formed so as to penetrate through the ferrite magnetic layer, they can be provided only in a limited region (central region) where the planar coil conductor does not exist (i.e., a central region inside the planar coil conductor). Therefore, sufficient heat radiation cannot be attained even with the heat radiation conductive layer and the temperature of the heat radiation conductive layer becomes very high. It is therefore difficult to run a current to the planar coil conductor beyond a somewhat elevated level.

SUMMARY

The present disclosure has been made in the above circumstances, and an object of the present disclosure is to provide a coil module which can suppress the power consumed in a coil in wireless charging as well as an apparatus incorporating such a coil module.

The present disclosure provides a coil module which can be disposed inside an electronic apparatus and can receive prescribed power, comprising a loop coil; a plate-like magnetic body that is disposed on the loop coil; and a conductive member that has prescribed conductivity and is disposed parallel with the plate-like magnetic body and on a surface, opposite to a surface on which the loop coil is disposed, of the magnetic body. The conductive member projects outward relative to at east a portion of a circumferential surface of the magnetic body.

According to this configuration, when the magnetic body is disposed over a shield member (which covers electronic components mounted on a substrate) with the conductive member interposed in between, the eddy current loss that occurs in the shield member when a current flows through the loop coil is reduced, whereby the AC resistance of the loop coil can be lowered. This makes it possible to suppress power that is consumed by the loop coil during wireless charging and hence to suppress heat generated by the loop coil, which in turn makes it possible to supply a larger current than in conventional techniques and hence to realize quick charging. Furthermore, since the heat generated by the loop coil is kept small, the influences of heat on the electronic components located close to the loop coil can be reduced.

In the above coil module, the conductive member may project outward away from the center of the loop coil relative to at least the portion of the circumferential surface of the magnetic body.

According to this configuration, since the conductive member projects outward relative to at least the portion of the circumferential surface of the magnetic body, the conductive can serve as a member for reducing the eddy current loss.

In the above coil module, the portion of the magnetic body relative to which the conductive member projects may account for at least half of the circumferential surface of the magnetic body.

The above coil module may have additional features that the loop coil is formed by winding at least one conductive wire into a loop form, the plate-like magnetic body has a cut through which portions of the loop coil extend; and the conductive member is disposed so as to cover at least the cut of the magnetic body.

According to this configuration, since the conductive member is disposed so as to cover the cut of the magnetic body, the thickness of extended portions of the conductive wire of the loop coil can be absorbed in the thickness of the magnetic body. If this measure were not taken, when, for example, a loop coil is produced using a single conductive wire, extending the one, starting from the inside edge of the coil, of two end portions of the conductive wire should cause increase of the thickness of the coil module by the diameter of the one end portion. Since the end portion, starting from the coil inside edge, of the conductive wire is wired through the cut of the magnetic body, a thickness corresponding to the diameter of that end portion of the conductive wire can be absorbed in the thickness of the magnetic body.

In the above coil module, the prescribed conductivity of the conductive member may be higher than conductivity of nickel silver (alloy of copper, zinc, and nickel).

In the above coil module, the conductive member may have a thickness that is larger than a value that is approximately equal to its skin depth at an operation frequency of the loop coil.

In the above coil module, the conductive member may be divided into two or more parts.

One aspect of the present disclosure provides an electronic apparatus inside which the above coil module is disposed in such a manner that the loop coil is closer to a surface of the electronic apparatus than the magnetic body, comprising a substrate; an electronic component mounted on the substrate; and a shield member which covers the electronic component, wherein the conductive member is a part of the shield member.

According to this configuration, since the shield member also serves as the conductive member, the body of the electronic apparatus can be made thinner and cost reduction is attained.

Another aspect of the present disclosure provides an electronic apparatus inside which the above coil module is disposed in such a manner that the loop coil is closer to a surface of the electronic apparatus than the magnetic body, wherein the electronic apparatus comprises a batter cell; and the conductive member is part of a battery cell case which surrounds the battery cell.

According to this configuration, since the battery cell case also serves as the conductive member, the body of the electronic apparatus can be made thinner and cost reduction is attained.

A further aspect of the present disclosure provides an electronic apparatus inside which the above coil module is disposed in such a manner that the loop coil is closer to a surface of the electronic apparatus than the magnetic body, wherein the conductive member is a first conductive member; the prescribed conductivity of the conductive member is equal to first conductivity; and a second conductive member having second conductivity that is lower than the first conductivity is disposed parallel with the plate-like magnetic body.

According to this configuration, since the first conductive member having higher conductivity than the second conductive member is used as the conductive member, when the magnetic body is disposed over the second conductive member (e.g., a shield member which covers electronic components mounted on a substrate) with the first conductive member interposed in between, the eddy current loss that occurs in the second conductive member when a current flows through the loop coil is reduced, whereby the AC resistance of the loop coil can be lowered. This makes it possible to suppress power that is consumed by the loop coil during wireless charging and hence to suppress heat generated by the loop coil, which in turn makes it possible to supply a larger current than in conventional techniques and hence to realize quick charging. Furthermore, since the heat generated by the loop coil is kept small, the influences of heat on the electronic components located close to the loop coil can be reduced.

In the above electronic apparatus, the first conductive member may be shaped like a plate and disposed between the plate-like magnetic body and the second conductive member.

According to this configuration, since the first conductive member is disposed between the magnetic body and the second conductive member, the eddy current loss that occurs in the second conductive member when a current flows through the loop coil is reduced, whereby the AC resistance of the loop coil can be lowered. This makes it possible to suppress power that is consumed by the loop coil during wireless charging and hence to suppress heat generated by the loop coil, which in turn makes it possible to supply a larger current than in conventional techniques and hence to realize quick charging. Furthermore, since the heat generated by the loop coil is kept small, the influences of heat on the electronic components located close to the loop coil can be reduced.

The above electronic apparatus may further comprise a substrate; electronic components mounted on the substrate; and a shield member which covers the electronic component, and the second conductive member may be part of the shield member.

According to this configuration, since the shield member also serves as the second conductive member, the body of the electronic apparatus can be made thinner and cost reduction is attained.

The above electronic apparatus may further comprise a battery cell, and the second conductive member is part of a battery cell case which surrounds the battery cell.

According to this configuration, since the battery cell case also serves as the second conductive member, the body of the electronic apparatus can be made thinner and cost reduction is attained.

The present disclosure makes it possible to suppress power that is consumed by the loop coil during wireless charging and hence to suppress heat generated by the loop coil, which in turn makes it possible to supply a larger current than in conventional techniques and hence to realize quick charging.

DETAILED DESCRIPTION OF EXEMPLARY EMBODIMENTS

Preferred embodiments of the present disclosure will be hereinafter described in detail with reference to the drawings.

Embodiment 1

Figure 1:
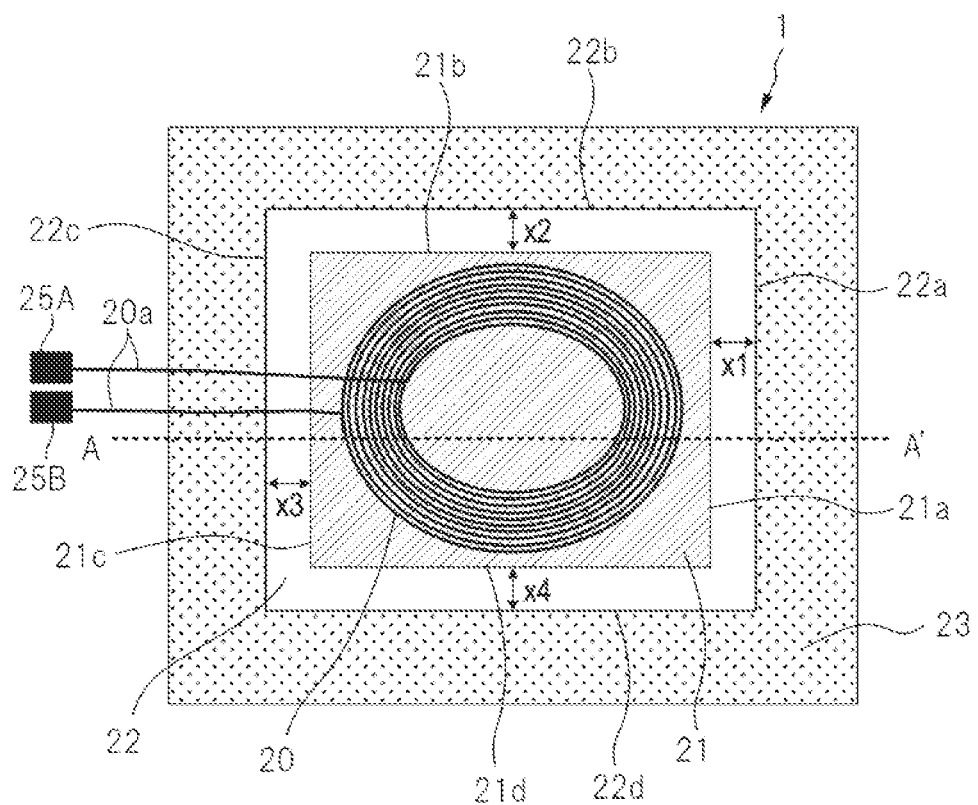
FIG. 1 is a plan view showing a general configuration of a coil module according to a first embodiment of the present disclosure.
Figure 2:
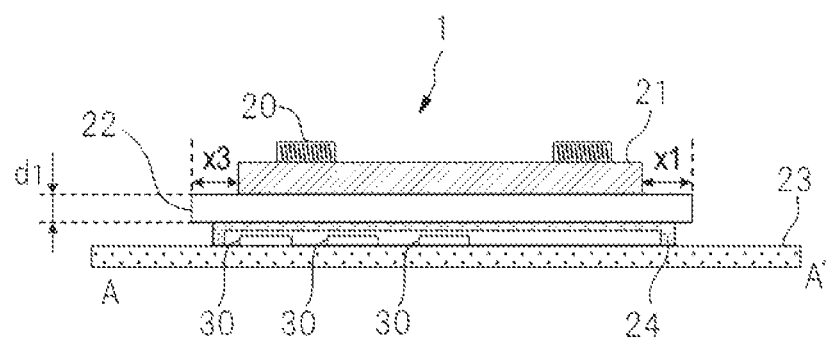
FIG. 2 is a sectional view of the coil module taken along line A-A' in FIG. 1.

FIG. 1 is a plan view showing a general configuration of a coil module 1 according to a first embodiment of the present disclosure. FIG. 2 is a sectional view of the coil module 1 taken along line A-A' in FIG. 1. The coil module 1 according to this embodiment shown in FIGS. 1 and 2 is a coil module that can be disposed inside an electronic apparatus such as a cellphone (not shown) and can receive a prescribed amount of power. The coil module 1 includes a loop coil 20, a plate-like magnetic body 21 underlying the loop coil 20, a plate-like conductive member (first conductive member) 22 which has prescribed conductivity and is disposed parallel with the plate-like magnetic body 21 on that surface of the magnetic body 21 which is opposite to the surface on which the loop coil 20 is disposed, a substrate 23 which is mounted with electronic components 30, and a shield member (second conductive member) 24 which covers the electronic components 30 mounted on the substrate 23.

The loop coil 20 is a coil formed by winding a single conductive wire 20a into a loop form. Two end portions of the loop coil 20 extend approximately parallel with each other from a loop coil body and their ends are connected to respective terminals 25A and 25B. The magnetic body 21 and the conductive member 22 have rectangular shapes. The conductive member 22 is larger than the magnetic body 21. That is, a distance x1 exists between one shorter edge 22a of the conductive member 22 and the corresponding shorter edge 21a of the magnetic body 21. A distance x3 exists between the other shorter edge 22c of the conductive member 22 and the corresponding shorter edge 21c of the magnetic body 21. A distance x2 exists between one longer edge 22b of the conductive member 22 and the corresponding longer edge 21b of the magnetic body 21. A distance x4 exists between the other longer edge 22d of the conductive member 22 and the corresponding longer edge 21d of the magnetic body 21. All of the distances x1 to x4 between the edges of the conductive member 22 and the corresponding edges of the magnetic body 21 are longer than 0 mm. The conductive member 22 need not always project relative to the entire circumferential surface of the magnetic body 21; it suffices that the conductive member 22 project relative to a portion of the circumferential surface of the magnetic body 21.

The conductive member 22 has a thickness d1 that is larger than a value that is approximately equal to its skin depth at the frequency (referred to as an "operation frequency") of a current flowing through the loop coil 20. The thickness d1 of the conductive member 22 is 0.2 mm when the operation frequency is 100 kHz, for example. The conductive member 22 is made of a metal that is higher in conductivity than the shield member 24, such as a metal that is higher in conductivity than nickel silver (alloy of copper, zinc, and nickel).

The thickness of the shield member 24 is 0.1 mm, for example. Since the conductive member 22 is disposed between the magnetic body 21 and the shield member 24, the eddy current loss that occurs in the shield member 24 when a current flows through the loop coil 20 is lower than in the case where the conductive member 22 is not disposed. The reduction in eddy current loss makes it possible to lower the AC resistance of the loop coil 20.

When a cell phone incorporating the coil module 1 according to this embodiment is put on a cradle (not shown) which is a device for supplying power to the cellphone, the coil module 1 is coupled with a coil module (not shown) provided in the cradle and power is transmitted from the cradle-side coil module to the coil module 1, as a result of which a current flows through the coil module 1.

As described above, in the coil module 1 according to this embodiment, the conductive member 22 which is larger in size than the magnetic body 21 and higher in conductivity than the shield member 24 and has the thickness d1 that is larger than a value that is approximately equal to its skin depth at an operation frequency is disposed between the magnetic body 21 and the shield member 24. Therefore, the eddy current loss that occurs in the shield member 24 (lossy conductor) when a current flows through the loop coil 20 is reduced, whereby the AC resistance of the loop coil 20 can be lowered. This makes it possible to suppress power that is consumed by the loop coil 20 during wireless charging and hence to suppress heat generated by the loop coil 20, which in turn makes it possible to supply a larger current than in conventional techniques and hence to realize quick charging. Furthermore, since the heat generated by the loop coil 20 is kept small, the influences of heat on the electronic components 30 located close to the loop coil 20 can be reduced.

Embodiment 2

Figure 3:
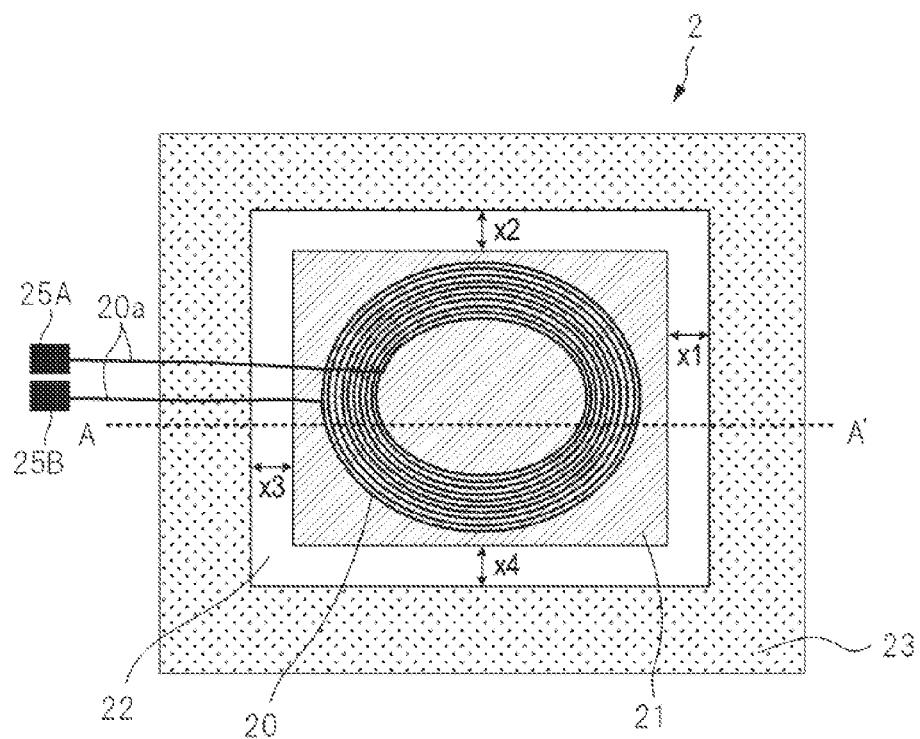
FIG. 3 is a plan view showing a general configuration of a coil module according to a second embodiment of the present disclosure.
Figure 4:
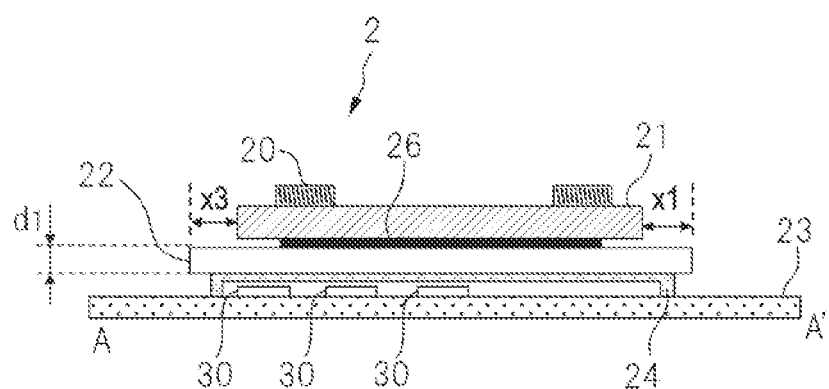
FIG. 4 is a sectional view of the coil module taken along line A-A' in FIG. 3.

FIG. 1 is a plan view showing a general configuration of a coil module 2 according to a second embodiment of the present disclosure. FIG. 4 is a sectional view of the coil module 2 taken along line A-A' in FIG. 3. In FIGS. 3 and 4, members having the same ones in FIGS. 1 and 2 are given the same symbols as the latter.

In the coil module 2 according to this embodiment shown in FIGS. 3 and 4, the magnetic body 21 is fixed to the conductive member 22 by a double-sided adhesive tape 26. The use of the double-sided adhesive tape 26 makes it possible to attach the magnetic body 21 to the conductive member 22 very easily.

Embodiment 3

Figure 5:
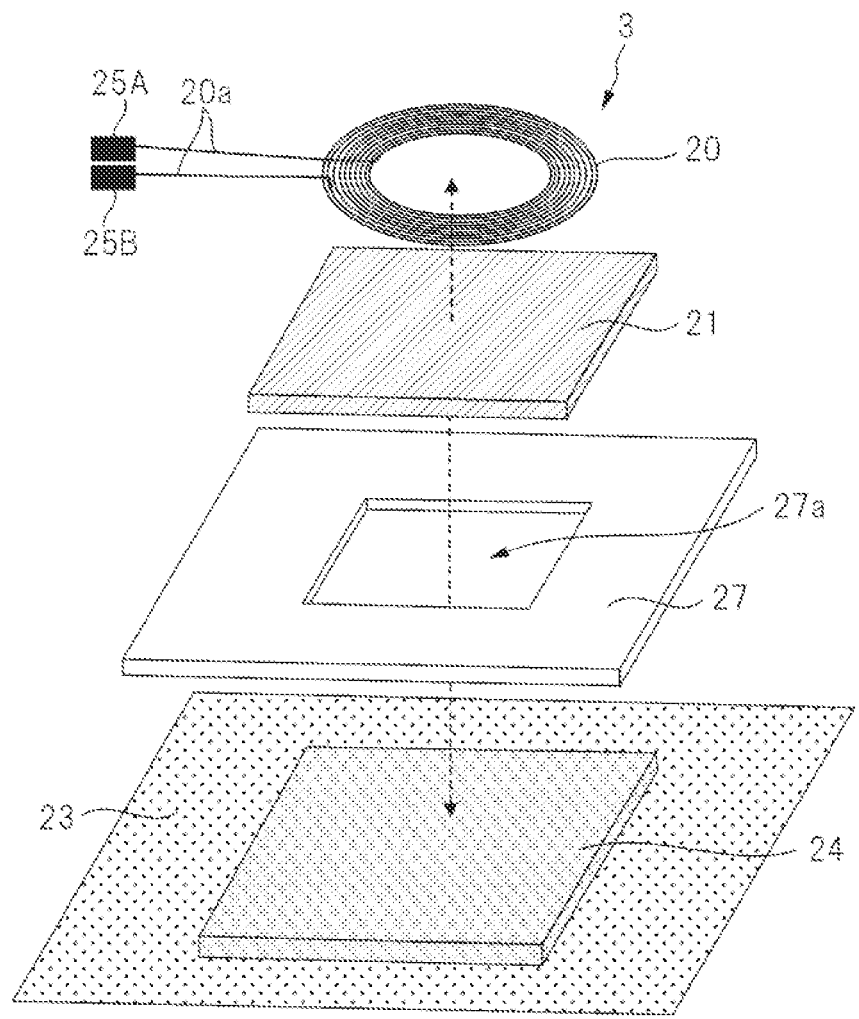
FIG. 5 is an exploded perspective view showing the configuration of a coil module according to a third embodiment of the present disclosure.
Figure 6:
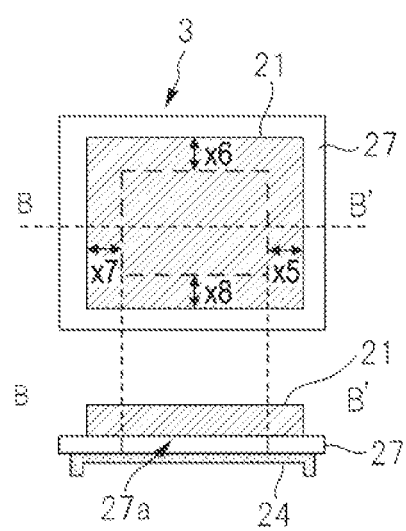
FIG. 6 includes a plan view of a conductive member, a magnetic body, and a shield member of the coil module shown in FIG. 5 and a sectional view of them taken along line B-B' in FIG. 5.

FIG. 5 is an exploded perspective view showing the configuration of a coil module 3 according to a third embodiment of the present disclosure. FIG. 6 includes a plan view of a conductive member, a magnetic body, and a shield member of the coil module 3 shown in FIG. 5 and a sectional view of them taken along line B-B' in FIG. 5. In FIGS. 5 and 6, members having the same ones in FIGS. 1 and 2 are given the same symbols as the latter.

As shown in FIG. 5, the coil module 3 according to this embodiment includes a plate-like conductive member (first conductive member) 27 having a rectangular hole 27a which is smaller than the magnetic body 21. The hole 27a is formed through the conductive member 27 approximately at the center. The conductive member 27 is disposed between the magnetic body 21 and the shield member (second conductive member) 24 in such a manner that the center of the hole 27a coincides with that of the magnetic body 21. Since the intended advantages can be obtained as long as the conductive member 27 overlaps with a peripheral portion of the magnetic body 21, a portion, corresponding to the other portion (i.e., the portion other than the peripheral portion) of the magnetic body 21, of the conductive member 27 is not always necessary. This is the reason why the hole 27a is formed through the conductive member 27 of the coil module 3 according to this embodiment.

As for the distances between the four edges of the hole 27a of the conductive member 27 and those of the magnetic body 21, as shown in FIG. 6, symbol x5 represents the distance between one shorter edges of them and symbol x7 represents the distance between the other shorter edges of them. Symbol x6 represents the distance between one longer edges of them and symbol x8 represents the distance between the other longer edges of them. All of the distances x5 to x8 are longer than 0 mm.

According to the coil module 3 of this embodiment, since as described above it employs the conductive member 27 having the rectangular hole 27a which is smaller than the magnetic body 21, an amount of material corresponding to the hole 27a can be saved and accordingly the coil module 3 can be reduced in weight and cost.

Embodiment 4

Figure 7:
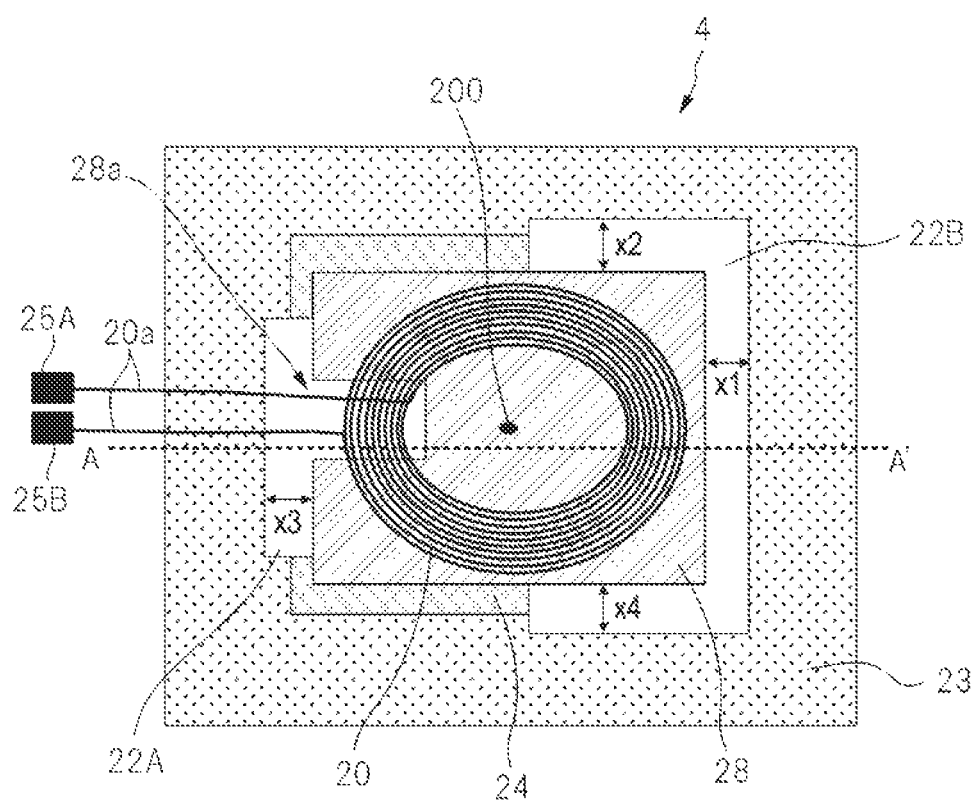
FIG. 7 is a plan view showing a general configuration of a coil module according to a fourth embodiment of the present disclosure.
Figure 8:
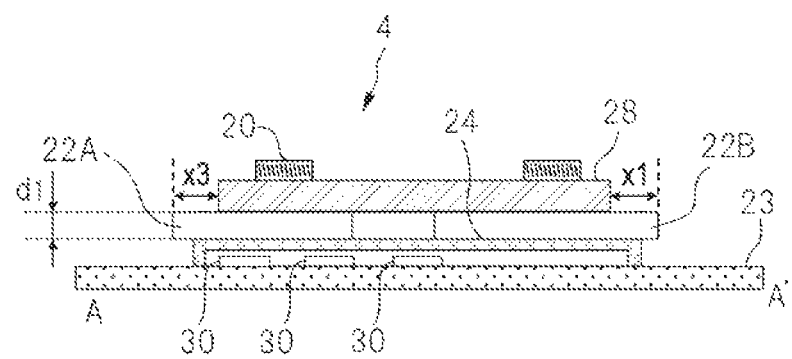
FIG. 8 is a sectional view of the coil module taken along line A-A' in FIG. 7.

FIG. 7 is a plan view showing a general configuration of a coil module 4 according to a fourth embodiment of the present disclosure. FIG. 8 is a sectional view of the coil module 4 taken along line A-A' in FIG. 4. In FIGS. 7 and 8, members having the same ones in FIGS. 1 and 2 are given the same symbols as the latter.

As shown in FIG. 7, the coil module 4 according to this embodiment includes a magnetic body 28 having a rectangular cut 28a and two conductive members (first conductive members) 22A and 22B. The cut 28a of the magnetic body 28 is formed so as to absorb the thickness of the extensions of the loop coil 20. Since portions of the conductive wire 20a extend from the coil body of the loop coil 20 through the cut 28a, the thickness of the extended portions of the conductive wire 20a of the loop coil 20 can be absorbed in the thickness of the magnetic body 28. If this measure were not taken, extending portions of the conductive wire 20a from the coil body of the loop coil 20 should cause increase of the thickness of the coil module by at least the diameter of the conductive wire 20a. Since the extended portions of the conductive wire 20a of the loop coil 20 are wired through the cut 28a of the magnetic body 28, a thickness corresponding to at least the diameter of the conductive wire 20a can be absorbed in the thickness of the magnetic body 28. The thickness of the coil module 4 can be reduced accordingly.

The conductive member 22A is disposed on the side where the cut 28a of the magnetic body 28 is formed, so as to project outward (i.e., away from the center 200 of the loop coil 20) relative to portions of the left side surfaces (as viewed in FIG. 7) of the magnetic body 28. The conductive member 22B is disposed on the side that is opposite to the side where the cut 28a is formed in the magnetic body 28, so as to project outward (i.e., away from the center 200 of the loop coil 20) relative to the top, right, and bottom side surfaces (as viewed in FIG. 7) of an approximately right half of the magnetic body 28. Although in this embodiment, the conductive member 22B is continuous so as to face the approximately right half of the magnetic body 28, the conductive member 22B may be divided into plural parts.

Symbol x3 represents the distance between the edge of the portion, projecting relative to the magnetic body 28, of the conductive member 22A and the corresponding edges, with the cut 28a, of the magnetic body 28. Symbols x1, x2, and x4 represent the distances between the edges of the portions, projecting relative to the approximately right half of the magnetic body 28, of the conductive member 22B and the corresponding edges of the magnetic body 28, respectively. All of the distances x1 to x4 are longer than 0 mm.

As described above, in the coil module 4 according to this embodiment, although the two divisional conductive members 22A and 22B are employed, they project outward relative to at least a portion of the circumferential surface of the magnetic body 28. Therefore, as in the above-described coil modules 1-3 according to the first to third embodiments, the eddy current loss that occurs in the shield member (second conductive member) 24 which is a lossy conductor when a current flows through the loop coil 20 is reduced, whereby the AC resistance of the loop coil 20 can be lowered. This makes it possible to suppress power that is consumed by the loop coil 20 during wireless charging and hence to suppress heat generated by the loop coil 20, which in turn makes it possible to supply a larger current than in conventional techniques and hence to realize quick charging. Furthermore, since the heat generated by the loop coil 20 is kept small, the influences of heat on the electronic components 30 located close to the loop coil 20 can be reduced.

Embodiment 5

Figure 9:
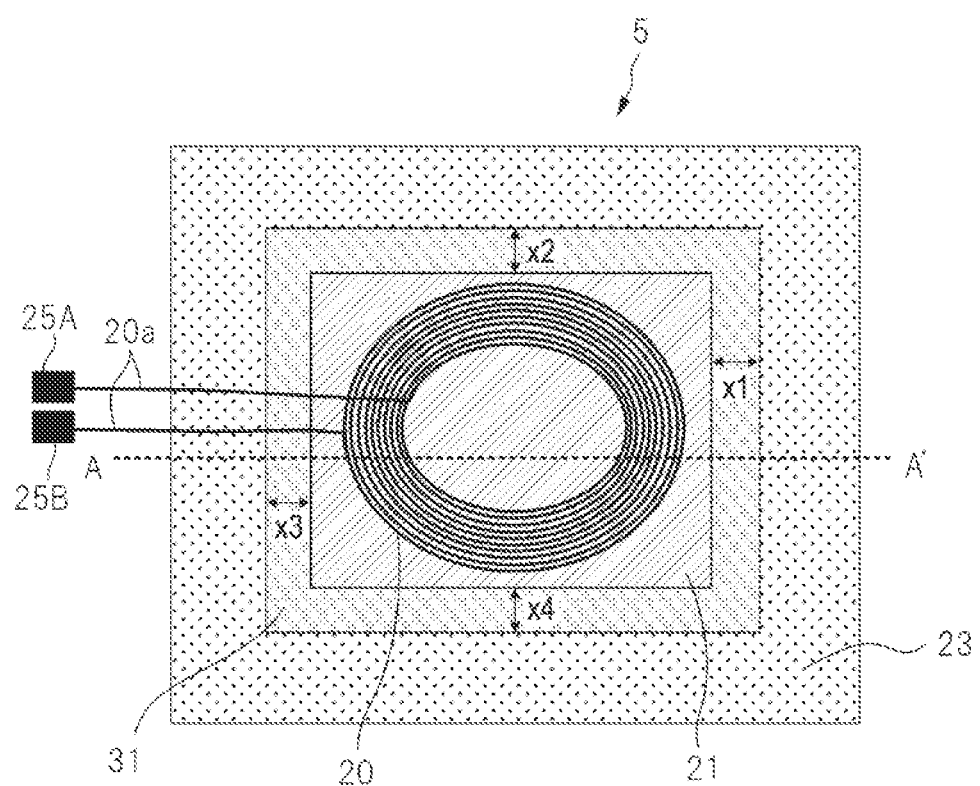
FIG. 9 is a plan view showing a general configuration of a coil module according to a fifth embodiment of the present disclosure.
Figure 10:
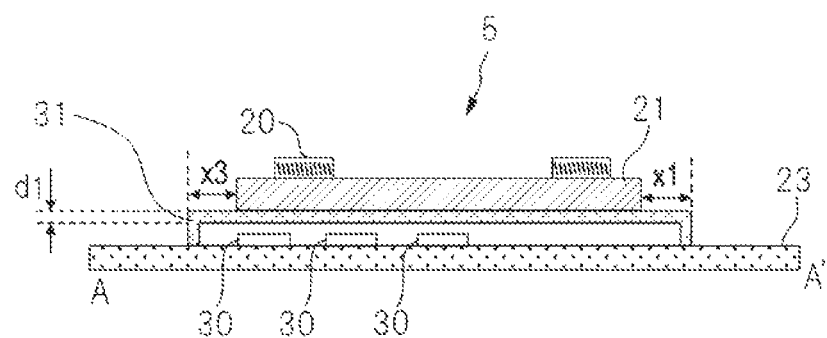
FIG. 10 is a sectional view of the coil module taken along line A-A' in FIG. 9.

FIG. 9 is a plan view showing a general configuration of a coil module 5 according to a fifth embodiment of the present disclosure. FIG. 10 is a sectional view of the coil module 5 taken along line A-A' in FIG. 9. In FIGS. 9 and 10, members having the same ones in FIGS. 1 and 2 are given the same symbols as the latter.

In the coil module 5 according to this embodiment shown in FIG. 9, a shield member 31 which is mounted on the substrate 23 is made of a high-conductivity metal and has a thickness d1 that is larger than a value that is approximately equal to its skin depth at an operation frequency. Although aluminum is suitably employed as the high-conductivity metal, a metal other than aluminum can naturally be used if its conductivity is higher than or equal to $3 \times 10^7$ S/m, for example. All of the distances x1 to x4 between the edges of the shield member 31 and the corresponding edges of the magnetic body 21 are longer than 0 mm. The resulting advantages become more remarkable as the distances x1 to x4 are increased.

As described above, according to the coil module 5 of this embodiment, since the shield member 31 also serves as a conductive member, the eddy current loss that occurs in the substrate 23 which is a lossy conductor can be kept low, whereby the AC resistance of the loop coil 20 can be lowered. This makes it possible to suppress power that is consumed by the loop coil 20 during wireless charging and hence to suppress heat generated by the loop coil 20, which in turn makes it possible to supply a larger current than in conventional techniques and hence to realize quick charging. Furthermore, since the heat generated by the loop coil 20 is kept small, the influences of heat on the electronic components 30 located close to the loop coil 20 can be reduced. Still further, since the shield member 31 also serves as a conductive member, the coil module 5 can be reduced in weight and thickness as well as cost.

Embodiment 6

Figure 11:
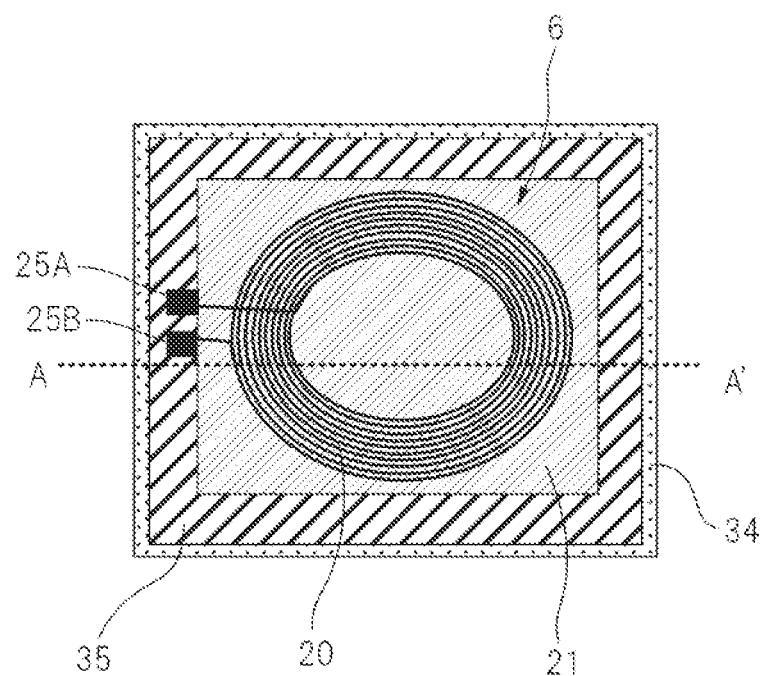
FIG. 11 is a plan view showing a general configuration of the inside of a battery pack incorporating a coil module according to a sixth embodiment of the present disclosure.
Figure 12:
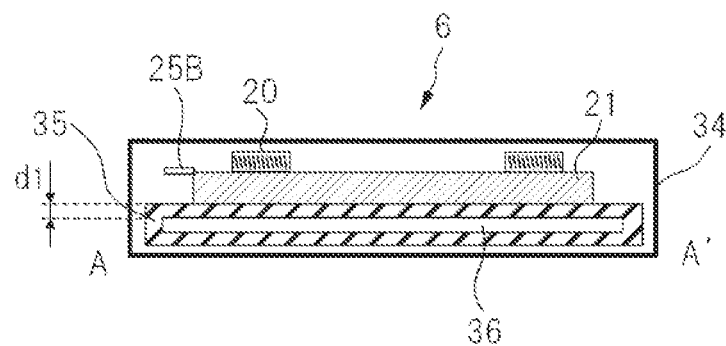
FIG. 12 is a sectional view of the battery pack taken along line A-A' in FIG. 11.

FIG. 11 is a plan view showing a general configuration of the inside of a battery pack 34 incorporating a coil module 6 according to a sixth embodiment of the present disclosure. FIG. 12 is a sectional view of the battery pack 34 taken along line A-A' in FIG. 11. In FIGS. 11 and 12, members having the same ones in FIGS. 1 and 2 are given the same symbols as the latter.

As shown in FIG. 11, the coil module 6 according to this embodiment is incorporated in the battery pack 34 and a battery cell case 35 which is provided inside the battery pack 34 is used as a member corresponding to a conductive member. The battery cell case 35 which surrounds a battery cell 36 is partly used as a conductive member. The battery cell case 35 is made of a metal such as aluminum whose conductivity is higher than or equal to $3 \times 10^7$ S/m, for example. The battery cell case 35 is larger in size than the magnetic body 21 and has a thickness d1 that is larger than a value that is approximately equal to its skin depth at an operation frequency.

As described above, according to the coil module 6 of this embodiment, since part of the battery cell case 35 serves as a conductive member, the eddy current loss that occurs in a substrate (not shown) which is located right under the battery pack 34 can be kept low, whereby the AC resistance of the loop coil 20 can be lowered. This makes it possible to suppress power that is consumed by the loop coil 20 during wireless charging and hence to suppress heat generated by the loop coil 20, which in turn makes it possible to supply a larger current than in conventional techniques and hence to realize quick charging. Furthermore, since the heat generated by the loop coil 20 is kept small, the influences of heat on electronic components (not shown) mounted on a substrate which is located right under the battery pack 34 can be reduced. Still further, since the battery cell case 35 also serves as a conductive member, the battery pack 34 can be reduced in weight and thickness as well as cost.

Embodiment 7

Figure 13:
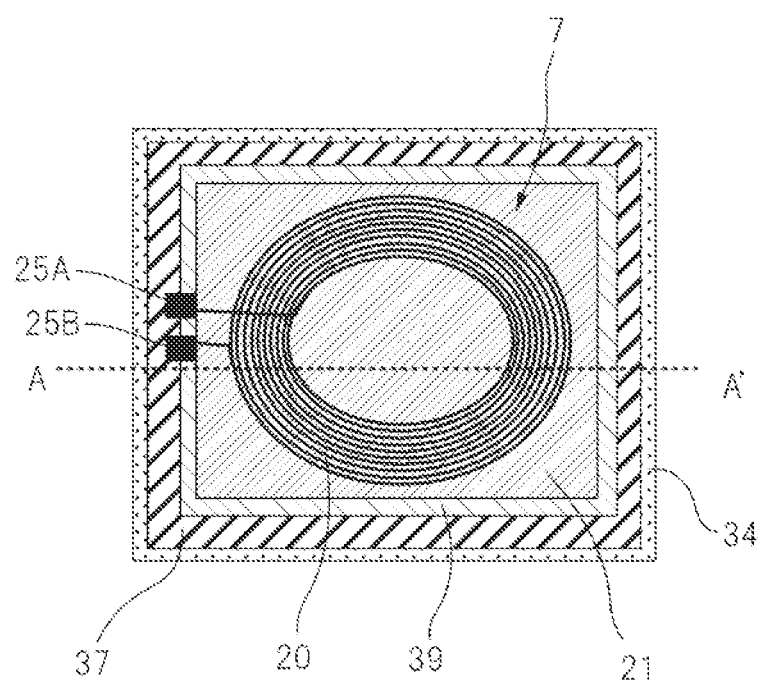
FIG. 13 is a plan view showing a general configuration of the inside of a battery pack incorporating a coil module according to a seventh embodiment of the present disclosure.
Figure 14:
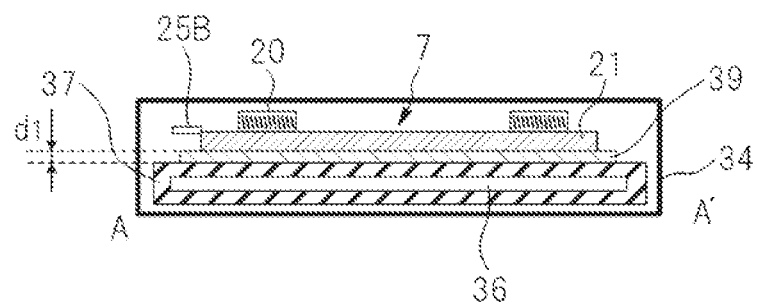
FIG. 14 is a sectional view of the battery pack taken along line A-A' in FIG. 13.

FIG. 13 is a plan view showing a general configuration of the inside of a battery pack 34 using a coil module 7 according to a seventh embodiment of the present disclosure. FIG. 14 is a sectional view of the battery pack 34 taken along line A-A' in FIG. 13. In FIGS. 13 and 14, members having the same ones in FIGS. 1 and 2 are given the same symbols as the latter.

As shown in FIG. 13, like the above-described coil module 6 according to the sixth embodiment, the coil module 7 according to this embodiment is incorporated in the battery pack 34. The coil module 7 according to this embodiment is different from the coil module 6 according to the sixth embodiment in that a first conductive member 39 is disposed between the magnetic body 21 and a battery cell case 37. The first conductive member 39 is larger in size than the magnetic body 21 and has a thickness d1 that is larger than a value that is approximately equal to its skin depth at an operation frequency. The first conductive member 39 is made of a metal such as aluminum whose conductivity is higher than or equal to $3 \times 10^7$ S/m, for example. The battery cell case 37 corresponds to the second conductive member and is lower in conductivity than the first conductive member 39.

As described above, according to the coil module 7 of this embodiment, since the high-conductivity first conductive member 39 is disposed between the magnetic body 21 and the battery cell case 37, the eddy current loss that occurs in the battery cell case 37 (lossy conductor) when a current flows through the loop coil 20 is reduced, whereby the AC resistance of the loop coil 20 can be lowered. This makes it possible to suppress power that is consumed by the loop coil 20 during wireless charging and hence to suppress heat generated by the loop coil 20, which in turn makes it possible to supply a larger current than in conventional techniques and hence to realize quick charging. Furthermore, since the heat generated by the loop coil 20 is kept small, the influences of heat on electronic components (not shown) mounted on a substrate (not shown) which is located right under the battery pack 34 can be reduced.

Although in the above first to seventh embodiments, the conductive members 22, 27, 22A and 22B are shaped into plates, the present disclosure is not limited to such a case.

Next, a description will be made of results of simulations that were carried out to verify the advantages of the coil module according to the present disclosure.

(Simulation No. 1)

Figure 15:
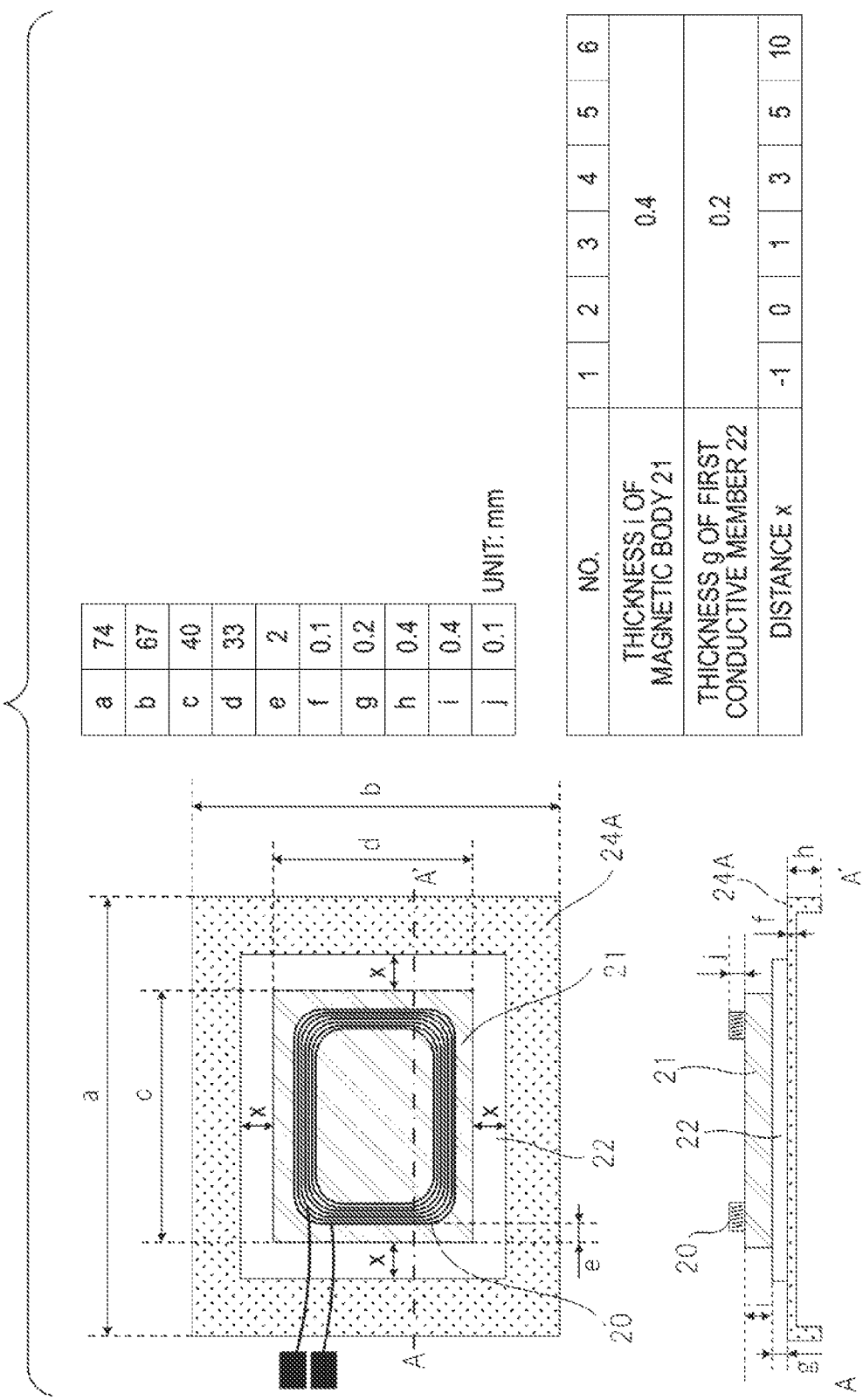
FIG. 15 shows conditions that were employed in simulating the relationship between the size of a first conductive member and the AC resistance of a loop coil.
Figure 16:
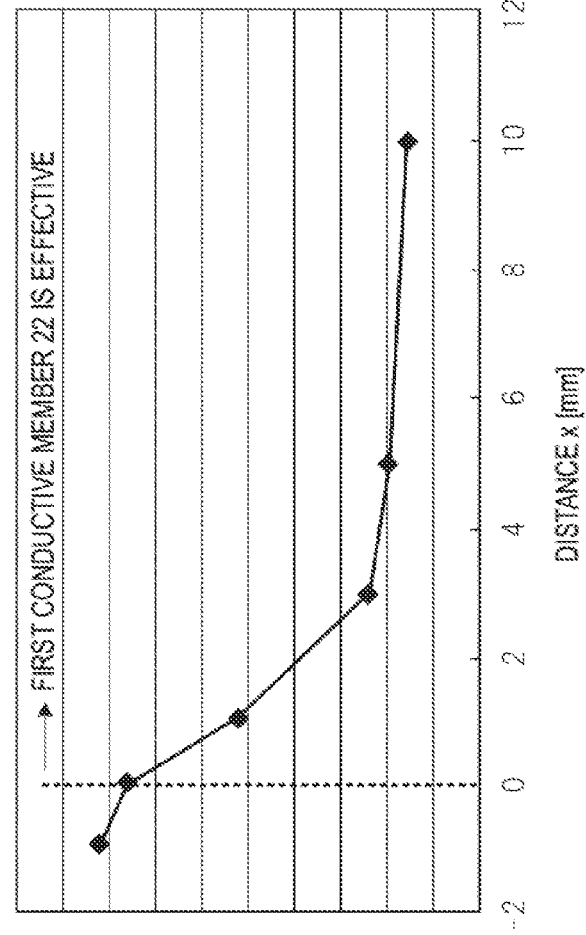
FIG. 16 shows a result of the simulation that was carried out under the conditions of FIG. 15.

FIG. 15 shows conditions that were employed in simulating the relationship between the size of the first conductive member 22 and the AC resistance of the loop coil 20. FIG. 16 shows a result of the simulation that was carried out under the conditions of FIG. 15.

In this simulation, a second conductive member 24A corresponds to, for example, the shield member 24 of the coil module 1 according to the first embodiment. As for the dimensions of the individual members of the coil module which are part of the conditions of the simulation, the length a of the longer edges of the second conductive member 24A is 74 mm, the length b of its shorter edges is 67 mm, the length c of the longer edges of the magnetic body 21 is 40 mm, and the length d of its shorter edges is 33 mm. The distance e between each outside shorter edge of the loop coil 20 and the corresponding shorter edge of the magnetic body 21 is 2 mm. The thickness f of the second conductive member 24A is 0.1 mm and the thickness g of the first conductive member 22 0.2 mm. The height h of the second conductive member 24A is 0.4 mm. The thickness i of the magnetic body 21 is 0.4 mm and the thickness j of the loop coil 20 is 0.1 mm.

Under the above conditions, the distance x between the edges of the magnetic body 21 and the corresponding edges of the first conductive member 22 was varied to have values −1 mm, 0 mm, 1 mm, 3 mm, 5 mm, and 10 mm. As shown in FIG. 16, resulting AC resistance values were 541 mΩ, 538 mΩ, 526 mΩ, 512 mΩ, 510 mΩ, and 508 mΩ. As is understood from this result, the advantages of the present disclosure are obtained when the distance x is set longer than or equal to 0 mm. It is noted that the inductance of the loop coil 20 was kept approximately constant (about 26 μH) even when the distance x between the edges of the magnetic body 21 and the corresponding edges of the first conductive member 22 was varied.

(Simulation No. 2)

Figure 17:
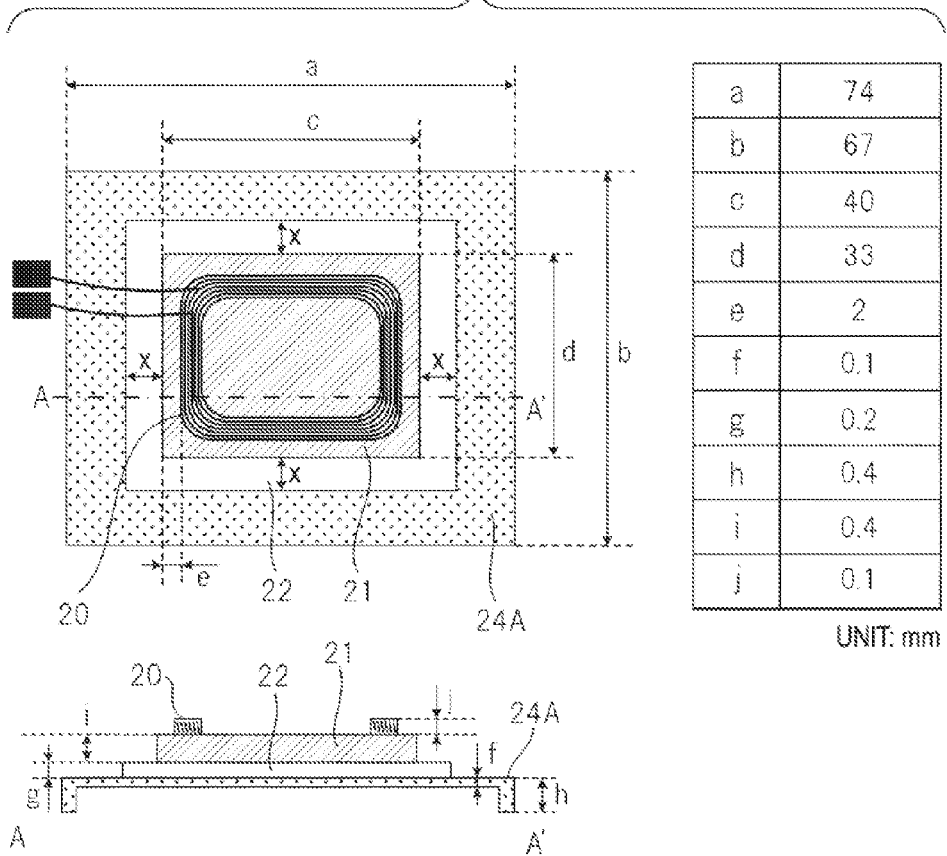
FIG. 17 shows conditions that were employed in simulating the relationship between the conductivity of the first conductive member and the AC resistance of the loop coil.
Figure 18:
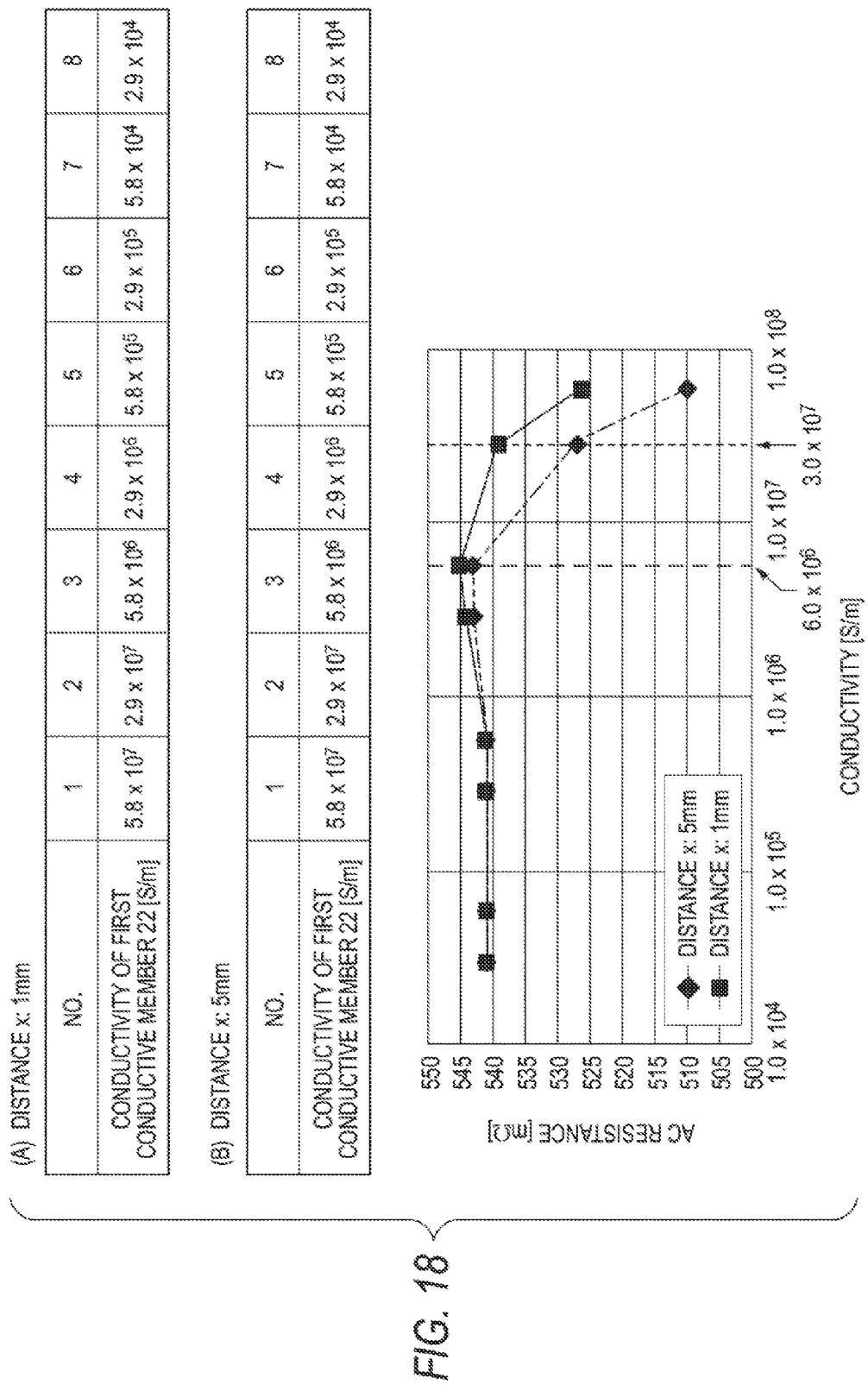
FIG. 18 shows a result of the simulation that was carried out under the conditions of FIG. 17.

FIG. 17 shows conditions that were employed in simulating the relationship between the conductivity of the first conductive member 22 and the AC resistance of the loop coil 20. FIG. 18 shows a result of the simulation that was carried out under the conditions of FIG. 17.

The dimensions of the individual members of the coil module which are part of the conditions of the simulation are the same as in the above-described Simulation No. 1 except the distance x, and hence will not be described here. Under those conditions, the conductivity (S/m) was varied for cases that the distance x between the edges of the magnetic body 21 and the corresponding edges of the first conductive member 22 was set at 1 mm and 5 mm, respectively. FIG. 18 shows how the AC resistance (mΩ) varied.

As shown in FIG. 18, the AC resistance decreases more steeply as the conductivity increases from around $6.0 \times 10^6$ S/m in the case where the distance x is equal to 5 mm than in the case where it is equal to 1 mm. The difference in AC resistance between the case that the distance x is 5 mm and the case that distance x is 1 mm is equal to about 13 mΩ when the conductivity is set at $3.0 \times 10^7$ S/m. It is understood from these facts that the distance x being equal to 5 mm is more effective.

In Simulation No. 2 the second conductive member 24A is made of copper and has a thickness 0.1 mm. It is noted that the effective range of conductivity varies depending on the material of the second conductive member 24A.

(Simulation No. 3)

Figure 19:
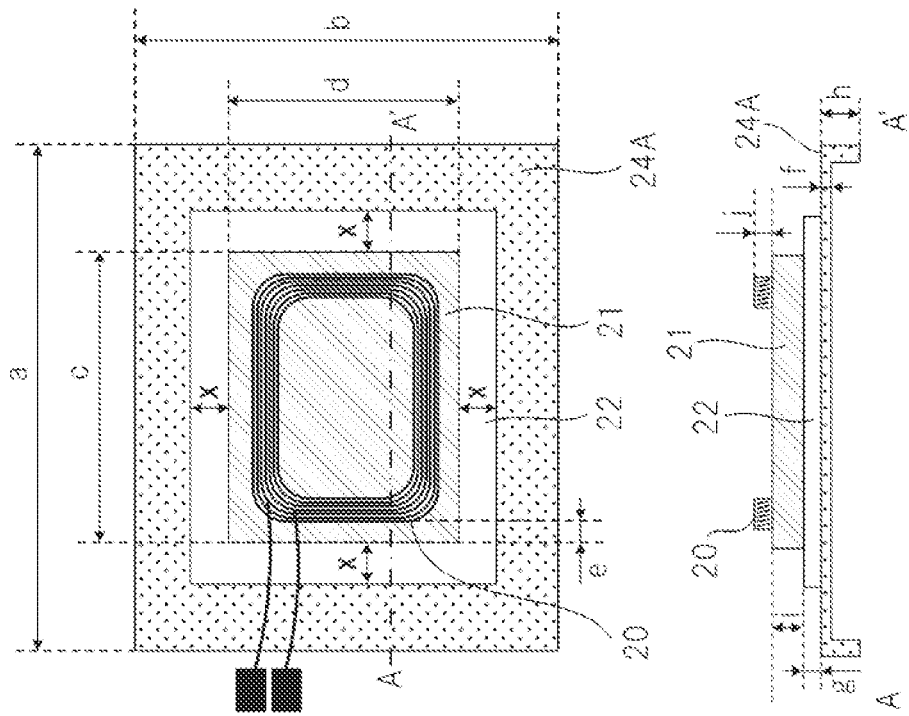
FIG. 19 shows conditions that were employed in simulating the relationship between the thickness of the first conductive member and the AC resistance of the loop coil.
Figure 20:
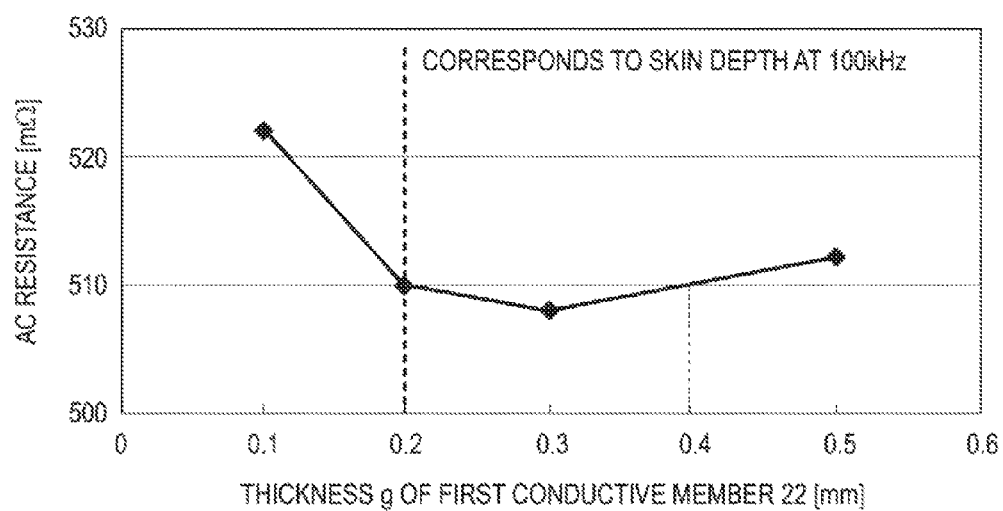
FIG. 20 shows a result of the simulation that was carried out under the conditions of FIG. 19.

FIG. 19 shows conditions that were employed in simulating the relationship between the thickness of the first conductive member 22 and the AC resistance of the loop coil 20. FIG. 20 shows a result of the simulation that was carried out under the conditions of FIG. 20.

The dimensions of the individual members of the coil module which are part of the conditions of the simulation are the same as in the above-described Simulation No. 1 except the thickness g of the first conductive member 22 and the distance x, and hence will not be described here. Under those conditions, the thickness g of the first conductive member 22 was set at 0.1 mm, 0.2 mm, 0.3 mm, and 0.5 mm. FIG. 20 shows how the AC resistance (mΩ) varied. It is understood that the thickness g of the first conductive member 22 being in the range of 0.2 mm to 0.4 mm is most effective.

The thickness g of the first conductive member 22 needs to be larger than or equal to its skin depth. The skin depth δ is given by the following equation:

$$\delta = \sqrt{2/\omega\mu\sigma}\,(m)$$

If the permeability μ is equal to $4\pi \times 10^{-7}$ H/m and the conductivity (copper) is equal to $58 \times 10^6$ S/m, the skin depth at an operation frequency 100 kHz is calculated to be about 0.2 mm. Symbol ω represents the angular frequency of a current.

Figure 21:
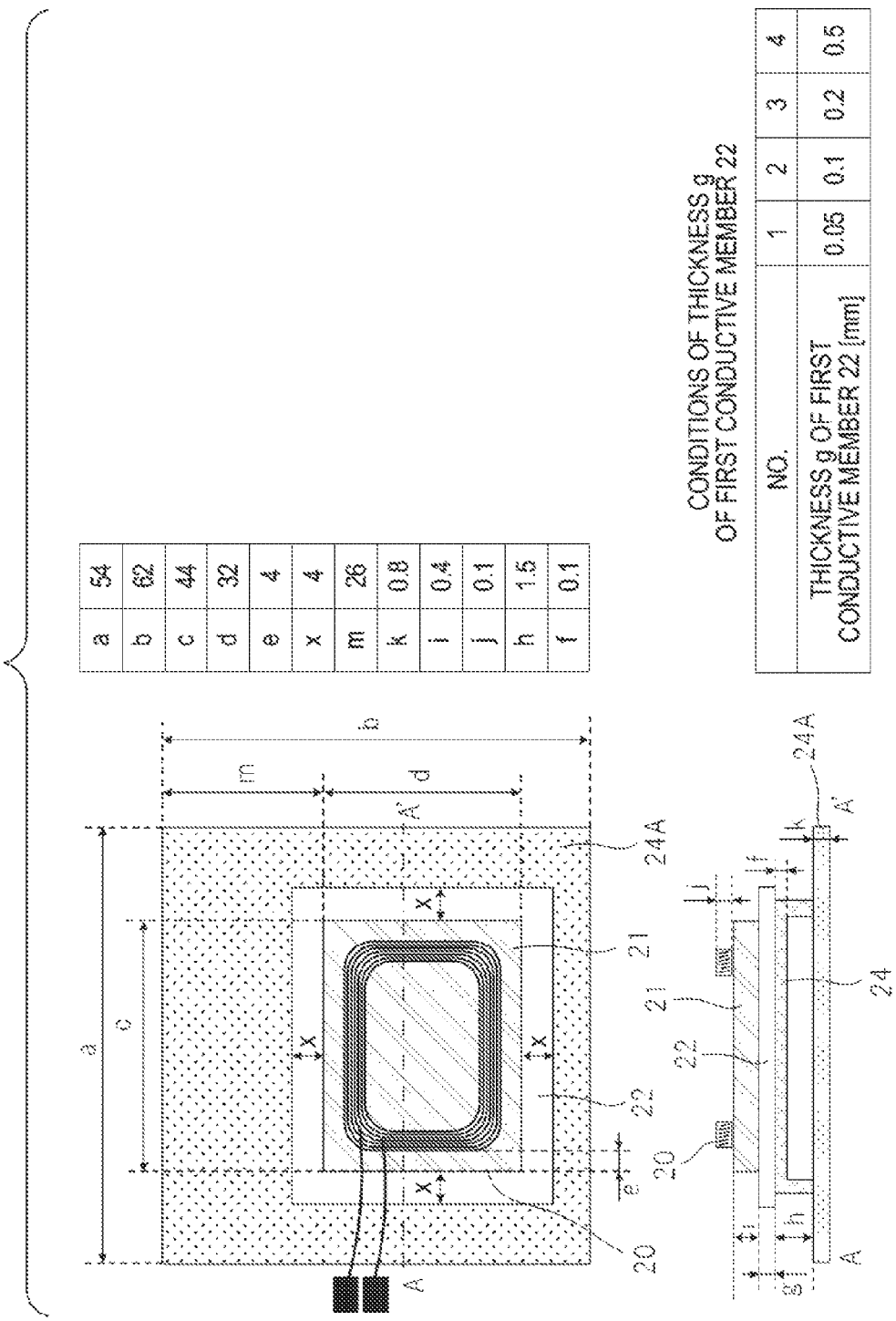
FIG. 21 shows conditions of actual measurements that were carried out to verify advantages of the coil module according to the present disclosure.
Figure 22:
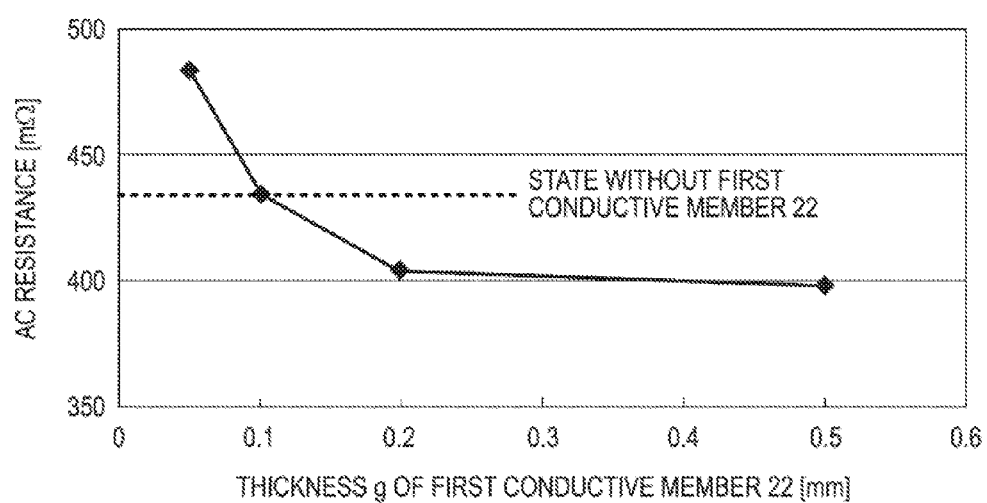
FIG. 22 shows results of the actual measurements that were carried out under the conditions of FIG. 21.

Next, a description will be made of a result of an experiment that was carried out to verify the advantages of the coil module according to the present disclosure. FIG. 21 shows conditions of actual measurements, and FIG. 22 shows results of the actual measurements that were carried out under the conditions of FIG. 21.

As for the conditions (dimensions) of the actual measurements, the length a of the longer edges of the second conductive member (substrate) 24A is 54 mm, the length b of its shorter edges is 62 mm, the length c of the longer edges of the magnetic body 21 is 44 mm, and the length d of its shorter edges is 32 mm. The distance e between each outside shorter edge of the loop coil 20 and the corresponding shorter edge of the magnetic body 21 is 4 mm. The distance x between the edges of the magnetic body 21 and the corresponding edges of the first conductive member 22 is 4 mm. The distance m between one longer edge of the magnetic body 21 and the corresponding longer edge of the second conductive member 24A is 26 mm. The thickness k of the second conductive member 24A is 0.8 mm, the thickness i of the magnetic body 21 is 0.4 mm, and the thickness j of the loop coil 20 is 0.1 mm. The height h of the first conductive member 22 as measured from the top surface of the second conductive member 24A is 1.5 mm. The thickness f of the shield member 24 is 0.1 mm.

Under the above conditions, the thickness g of the first conductor 22 was varied to have values 0.05 mm, 0.1 mm, 0.2 mm, and 0.5 mm. Resulting AC resistance values (mΩ) were as shown in FIG. 22. As is understood from this result, the advantages of the present disclosure are obtained by employing the first conductive member 22.

The present disclosure is not limited to the above embodiments, and various modifications, improvements, etc. can be made as appropriate. The material, shape, dimensions, related numerical values, form of implementation, number (where plural ones are provided), location, etc. of each constituent element of each embodiment are optional and are not restricted as long as the present disclosure can be implemented.

Providing, among others, the advantage that the power that is consumed by the coil during wireless charging can be suppressed, the present disclosure can be applied to electronic apparatus such as cellphones having a wireless charging function.

The present disclosure can also be applied to vehicles, stationary electronic apparatus (e.g., general household equipment), etc. having a wireless charging function. As for the positional relationships in a cross section between the coil, magnetic body, conductive members, and shield member, it is preferable that their intervals be as small as possible in the case of cellphones which are required to be thin and compact. On the other hand, when the present disclosure is applied to large products such as vehicles, there may be some room for each of these intervals.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2013-082069 filed on Apr. 10, 2013, the contents of which are incorporated herein by reference.

What is claimed is:

1. An electronic apparatus comprising:
    a coil module configured to receive prescribed power, the coil module including a planar magnetic body having a first surface and a second surface opposite from each other, the coil module further including a loop coil disposed on the first surface of the planar magnetic body in an overlapped manner;
    a substrate;
    an electronic component mounted on the substrate; and
    a shield member part that covers the electronic component, the shield member part including a conductive member having prescribed conductivity,
    wherein
        the conductive member of the shield member part is disposed along the second surface of the planar magnetic body; and
    wherein the conductive member protrudes outward from the planar magnetic body across at least a portion of a circumferential part of the planar magnetic body.

2. The electronic apparatus according to claim 1, wherein the loop coil is disposed outside relative to the planar magnetic body disposed inside within the electronic apparatus.

3. An electronic apparatus comprising:
    a coil module configured to receive prescribed power, the coil module including a planar magnetic body having a first surface and a second surface opposite from each other, the planar magnetic body including a cut-out portion, the coil module further including a loop coil disposed on the first surface of the planar magnetic body in an overlapped manner, the loop coil being formed by winding at least one conductive wire into a loop form and the at least one conductive wire being drawn out via the cut-out portion of the planar magnetic body;
    a substrate;
    an electronic component mounted on the substrate; and
    a shield member part that covers the electronic component, the shield member part including a conductive member having prescribed conductivity, wherein the conductive member is disposed to overlap at least a portion of the cut-out portion of the planar magnetic body.

4. An electronic apparatus comprising:
a coil module configured to receive prescribed power, the coil module including:
 a planar magnetic body having a first surface and a second surface opposite from each other, and
 a loop coil disposed on the first surface of the planar magnetic body in an overlapped manner;
a conductive member having prescribed conductivity and being disposed along the second surface of the planar magnetic body; and
a battery cell,
wherein the conductive member protrudes outward from the planar magnetic body across at least a portion of a circumferential part of the planar magnetic body; and
wherein the conductive member is a part of a battery cell enclosure that holds the battery cell.

5. The electronic apparatus according to claim 4, wherein the loop coil is disposed outside relative to the planar magnetic body disposed inside within the electronic apparatus.

6. An electronic apparatus comprising:
a coil module configured to receive prescribed power, the coil module including:
 a planar magnetic body having a first surface and a second surface opposite from each other, the planar magnetic body including a cut-out portion, and
 a loop coil disposed on the first surface of the planar magnetic body in an overlapped manner, the loop coil being formed by winding at least one conductive wire into a loop form and the at least one conductive wire being drawn out via the cut-out portion of the planar magnetic body;
a conductive member having prescribed conductivity and being disposed along the second surface of the planar magnetic body; and
a battery cell,
wherein the conductive member is a part of a battery cell enclosure that holds the battery cell; and
wherein the conductive member is disposed to overlap at least a portion of the cut-out portion of the planar magnetic body.

7. An electronic apparatus comprising:
a coil module configured to receive prescribed power
the coil module including:
 a planar magnetic body having a first surface and a second surface opposite from each other, and
 a loop coil disposed on the first surface of the planar magnetic body in an overlapped manner;
a first conductive member that has first prescribed conductivity and is disposed along the second surface of the planar magnetic body; and
a second conductive member that has second prescribed conductivity lower than the first prescribed conductivity,
wherein the first conductive member protrudes outward from the planar magnetic body across at least a portion of a circumferential part of the planar magnetic body;
wherein the second conductive member is disposed along the second surface of the planar magnetic body; and
wherein the first conductive member is disposed between the planar magnetic body and the second conductive member.

8. The electronic apparatus according to claim 7, wherein the first conductive member has a planar shape and is disposed between the planar magnetic body and the second conductive member.

9. The electronic apparatus according to claim 7, further comprising:
a substrate;
an electronic component mounted on the substrate; and
a shield member part that covers the electronic component,
wherein the second conductive member is a part of the shield member part.

10. The electronic apparatus according to claim 7, further comprising:
a battery cell,
wherein the second conductive member is a part of a battery cell enclosure that holds the battery cell.

11. The electronic apparatus according to claim 7, wherein the loop coil is disposed outside relative to the planar magnetic body disposed inside within the electronic apparatus.

12. An electronic apparatus comprising:
a coil module configured to receive prescribed power, the coil module including:
 a planar magnetic body having a first surface and a second surface opposite from each other, the planar magnetic body including a cut-out portion, and
 a loop coil disposed on the first surface of the planar magnetic body in an overlapped manner, the loop coil being formed by winding at least one conductive wire into a loop form and the at least one conductive wire being drawn out via the cut-out portion of the planar magnetic body;
a first conductive member that has first prescribed conductivity and is disposed along the second surface of the planar magnetic body to overlap at least a portion of the cut-out portion of the planar magnetic body; and
a second conductive member that has second prescribed conductivity lower than the first prescribed conductivity and is disposed along the second surface of the planar magnetic body,
wherein the first conductive member is disposed between the planar magnetic body and the second conductive member.

13. The electronic apparatus according to claim 12, wherein the first conductive member has a planar shape and is disposed between the planar magnetic body and the second conductive member.

\* \* \* \* \*